(12) United States Patent
Sugaya

(10) Patent No.: US 9,585,082 B2
(45) Date of Patent: Feb. 28, 2017

(54) MOBILE USER TERMINAL, METHOD OF SWITCHING COMMUNICATIONS, AND PROGRAM FOR MOBILE USER TERMINAL

(71) Applicant: OPTiM Corporation, Saga (JP)

(72) Inventor: Shunji Sugaya, Tokyo (JP)

(73) Assignee: OPTiM CORPORATION, Sagashi (JP)

( * ) Notice: Subject to any disclaimer, the term of this patent is extended or adjusted under 35 U.S.C. 154(b) by 0 days.

(21) Appl. No.: 15/042,267

(22) Filed: Feb. 12, 2016

(65) Prior Publication Data

US 2016/0366636 A1 Dec. 15, 2016

(30) Foreign Application Priority Data

Jun. 12, 2015 (JP) ................. 2015-118827

(51) Int. Cl.
| | |
|---|---|
| *H04W 48/04* | (2009.01) |
| *H04W 4/02* | (2009.01) |
| *H04W 48/20* | (2009.01) |
| *H04W 84/12* | (2009.01) |

(52) U.S. Cl.
CPC ............ *H04W 48/04* (2013.01); *H04W 4/02* (2013.01); *H04W 48/20* (2013.01); *H04W 84/12* (2013.01)

(58) Field of Classification Search
CPC .. H04W 36/32; H04W 36/0083; H04W 48/04
See application file for complete search history.

(56) References Cited

U.S. PATENT DOCUMENTS

| | | | | |
|---|---|---|---|---|
| 2012/0127955 A1* | 5/2012 | Gandham | ......... | H04W 36/0083 370/331 |
| 2014/0153485 A1* | 6/2014 | Tsuda | .............. | H04W 36/32 370/328 |

FOREIGN PATENT DOCUMENTS

JP 2013-128168 6/2013

* cited by examiner

*Primary Examiner* — Myron K Wyche
(74) *Attorney, Agent, or Firm* — Lex IP Meister, PLLC

(57) ABSTRACT

The present invention is to provide a mobile user terminal, a method of switching communications, and a program for a mobile user terminal that are capable of suppressing extra power consumption and selecting Wi-Fi® connection for data communication in an area providing a Wi-Fi® connection service. The mobile user terminal 10 associates and stores location information about a location where the mobile user terminal can connect to the wireless LAN with an ID to connect this wireless LAN; detects present location information of the mobile user terminal; and performs data communication through the wireless LAN in priority to a base station 3 by selecting the ID to connect the wireless LAN if judging that the detected location information is about a location where the mobile user terminal can connect to the wireless LAN.

4 Claims, 8 Drawing Sheets

Fig. 5

SERVICE DATA TABLE

| SERVICE NAME | SERVICE CONTENT |
|---|---|
| SERVICE A | AREA A: WI—FI® COMMUNICATION + DATA COMMUNICATION |
| SERVICE B | AREA A: WI—FI® COMMUNICATION + DATA COMMUNICATION |

Fig. 6

AREA DATA TABLE

| USER ID | 001 | | | |
|---|---|---|---|---|
| | LOCATION AREA A | | LOCATION AREA B | |
| AREA A: 1 | LATITUDE- LONGITUDE (X0,Y0)-(X1,Y1) | AREA B: 1 | LATITUDE- LONGITUDE (X0,Y0)-(X1,Y1) | |
| | SSID:XXX PASSWORD:ZZZ | | SSID:XXX PASSWORD:ZZZ | |
| AREA A: 2 | LATITUDE- LONGITUDE (X2,Y2)-(X3,Y3) | AREA B: 2 | LATITUDE- LONGITUDE (X2,Y2)-(X3,Y3) | |
| | SSID:YYY PASSWORD:VVV | | SSID:YYY PASSWORD:VVV | |

# MOBILE USER TERMINAL, METHOD OF SWITCHING COMMUNICATIONS, AND PROGRAM FOR MOBILE USER TERMINAL

CROSS REFERENCE TO RELATED APPLICATIONS

This application claims priority to Japanese Patent Application No. 2015-118827 filed on Jun. 12, 2015, the entire contents of which are incorporated by reference herein.

TECHNICAL FIELD

The present invention relates to a mobile user terminal, a method of switching communications, and a program for a mobile user terminal that enable data communication through a wireless LAN and through connection to a base station.

BACKGROUND ART

Recently, chances to view websites, moving images, etc., through the Internet inside and outside have been increased due to the spread of the highly-functional mobile terminals called smart phones and tablet terminals.

Moreover, for such highly-functional mobile terminals, the file sizes of some websites, moving images, etc. in recent years have been increased, and wireless LAN communication enabled by Wi-Fi® connection is used.

Such a highly-functional mobile terminal is disclosed to have a configuration to acquire its location information by using a GPS system, predict the route from the present location, and switch the connection to a wireless LAN before entering a wireless LAN spot existing on the predicted route (see Patent Document 1).

CITATION LIST

Patent Literature

Patent Document 1: JP 2013-128168 A

SUMMARY OF INVENTION

According to Patent Document 1, the mobile terminal predicts its route by acquiring a GPS signal at a constant cycle, judges whether or not a wireless LAN spot exists on the predicted route, and performs wireless LAN connection if exists.

However, in the method described in Patent Document 1, if consuming power by performing processes necessary for predicting the route or if departing from the predicted route, the mobile terminal hardly selects Wi-Fi® connection for data communication in an area providing a Wi-Fi® connection service.

In order to these demands, an objective of the present invention relates to a mobile user terminal, a method of switching communications, and a program for a mobile user terminal that are capable of suppressing extra power consumption and selecting Wi-Fi® connection for data communication in an area providing a Wi-Fi® connection service.

According to the first aspect of the present invention, a mobile user terminal enabling data communication through a wireless LAN and through connection to a base station includes:

a location information storing unit that associates and stores location information about a location where the mobile user terminal can connect to the wireless LAN with an ID to connect the wireless LAN;

a location information detection unit that detects present location information of the mobile user terminal;

a wireless LAN area judgment unit that judges whether or not the detected location information is about a location where the mobile user terminal can connect to the wireless LAN; and a wireless LAN connection unit that performs data communication through the wireless LAN in priority to the base station by selecting the ID to connect the wireless LAN if judging that the detected location information is about a location where the mobile user terminal can connect to the wireless LAN.

According to the first aspect of the present invention, a mobile user terminal enabling data communication through a wireless LAN and through connection to a base station associates and stores location information about a location where the mobile user terminal can connect to the wireless LAN with an ID to connect the wireless LAN; detects present location information of the mobile user terminal; judges whether or not the detected location information is about a location where the mobile user terminal can connect to the wireless LAN; and performs data communication through the wireless LAN in priority to the base station by selecting the ID to connect the wireless LAN if judging that the detected location information is about a location where the mobile user terminal can connect to the wireless LAN.

The first aspect of the present invention falls into the category of a mobile user terminal, but the categories of a method of switching communications, and a program for a mobile user terminal have the same functions and effects The second aspect of the present invention provides the mobile user terminal according to the first aspect of the present invention, in which the data communication through a wireless LAN is data communication through the Wi-Fi® connection, and the ID to connect to the wireless LAN is an SSID.

According to the second aspect of the present invention, in the mobile user terminal according to the first aspect of the present invention, the data communication through a wireless LAN is data communication through the Wi-Fi® connection, and the ID to connect to the wireless LAN is an SSID.

According to the third aspect of the present invention, a method of switching communications executed by a mobile user terminal enabling data communication through a wireless LAN and through connection to a base station includes the steps of:

associating and storing location information about a location where the mobile user terminal can connect to the wireless LAN with an ID to connect the wireless LAN;

detecting present location information of the mobile user terminal;

judging whether or not the detected location information is about a location where the mobile user terminal can connect to the wireless LAN; and performing data communication through the wireless LAN in priority to the base station by selecting the ID to connect the wireless LAN if judging that the detected location information is about a location where the mobile user terminal can connect to the wireless LAN.

According to the fourth aspect of the present invention, a computer program product for use in a mobile user terminal enabling data communication through a wireless LAN and through connection to a base station includes a non-transitory computer usable medium having a set of instructions physically embodied therein, the set of instructions including computer readable program code, which when executed by the mobile user terminal causes the information processing unit to:

associate and store location information about a location where the mobile user terminal can connect to the wireless LAN with an ID to connect the wireless LAN;

detect present location information of the mobile user terminal;

judge whether or not the detected location information is about a location where the mobile user terminal can connect to the wireless LAN; and perform data communication through the wireless LAN in priority to the base station by selecting the ID to connect the wireless LAN if judging that the detected location information is about a location where the mobile user terminal can connect to the wireless LAN.

The present invention can provide a mobile user terminal, a method of switching communications, and a program for a mobile user terminal that are capable of suppressing extra power consumption and selecting Wi-Fi® connection for data communication in an area providing a Wi-Fi® connection service.

BRIEF DESCRIPTION OF DRAWINGS

FIG. 5 shows a service data table stored by the mobile user terminal 10.

FIG. 6 shows an area data table stored by the mobile user terminal 10.

DESCRIPTION OF EMBODIMENTS

Embodiments of the present invention will be described below with reference to the attached drawings. However, this is illustrative only, and the technological scope of the present invention is not limited thereto.

Overview of Communication Switching System 1

Figure 1:
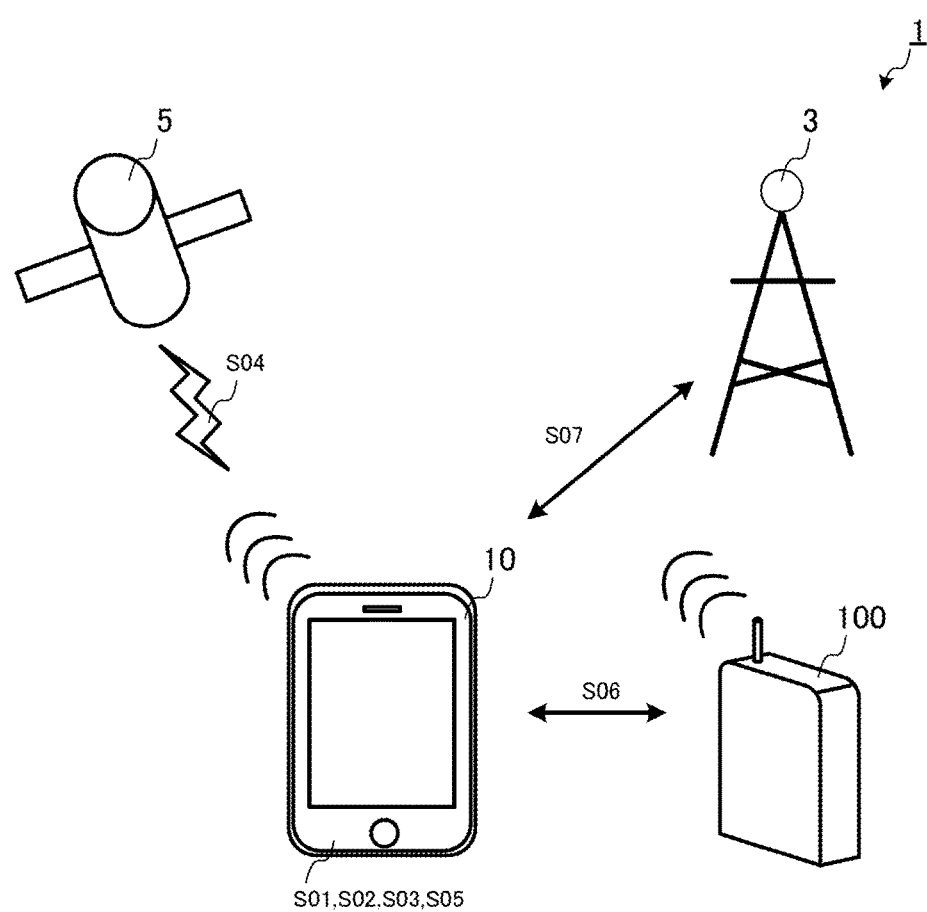
FIG. 1 shows a schematic diagram of the communication switching system 1.

FIG. 1 shows the schematic diagram of the communication switching system 1 according to a preferable embodiment of the present invention. The communication switching system 1 includes a mobile user terminal 10, a base station 3, a GPS system 5, and a router 100. The mobile user terminal 10 performs data communication through the Wi-Fi® connection as data communication through a wireless LAN. The mobile user terminal 10 can acquire information on its present position by a GPS system 5. The mobile user terminal 10 enables data communication with a router 100 through Wi-Fi® communication. The mobile user terminal 10 also enables data communication and other communications with a base station 3. The mobile user terminal 100 may directly communicate with a public line network 5 (e.g. the Internet network, a third and a fourth generation networks).

In the communication switching system 1, the mobile user terminal 10 first sets a service content of the data communication (step S01). In the step S01, the service content of data communication that the mobile user terminal sets is provided from a carrier to which the user of the mobile user terminal 10 has a contract. The service content of data communication may be set from an input directly from a user or from a server, a data base, etc., of the carrier.

Then, the mobile user terminal 10 receives location information about a location where the mobile user terminal 10 can connect to a wireless LAN; and also receives Wi-Fi® access information to connect the wireless LAN (step S02). In the step S02, the mobile user terminal 10 may receive location information and Wi-Fi® access information from an input directly from the user or may set from a server, a data base, etc., of a provider who provides the wireless LAN service.

In the step S02, the location information received by a mobile user terminal 10 specifies latitude and longitude or others directly input from the user; or acquired from an application such as a map application, a website, etc., on a public line network, etc., or a GPS system 5. The location information received by a mobile user terminal 10 may be received by another method.

In the step S02, the Wi-Fi® access information received by a mobile user terminal 10 is an ID to connect to a wireless LAN, which includes an SSID and an SSID password. The Wi-Fi® access information received by a mobile user terminal 10 may be other information to connect to a wireless LAN.

The mobile user terminal 10 associates and stores the received location information with the received Wi-Fi® access information (step S03).

Then, the mobile user terminal 10 acquires its location information from a GPS system 5 and recognizes its location, at a predetermined timing (step S04). In the step S04, the predetermined timing is, for example, when an application to perform data communication starts, at a predetermined time intervals, or while the mobile user terminal 10 stops to vibrate for a fixed time. The mobile user terminal 10 may always acquire its location information from a GPS system 5.

Then, the mobile user terminal 10 judges whether or not its location information indicates that the mobile user terminal 10 can connect to a wireless LAN (step S05). In the step S05, the mobile user terminal 10 searches stored location information by its location information and judges whether or not in the present location of the mobile user terminal 10 can connect to a wireless LAN. In the step S05, the mobile user terminal 10 may acquire location information and Wi-Fi® access information on the location of a public wireless LAN spot from a server, a data base, etc., of a provider providing a public wireless LAN service, search the acquired location information by the location information of the mobile user terminal 10 itself, and judge whether or not the location information is a location where the mobile user terminal 10 can connect to a wireless LAN.

In the step S05, the mobile user terminal 10 judges whether or not its location information indicates that the mobile user terminal 10 can connect to a wireless LAN by judging whether or not the location information of the mobile user terminal 10 exists in the stored or acquired location information.

If the mobile user terminal 10 judges that the mobile user terminal 10 can connect to a wireless LAN, in other words, if the location information of the mobile user terminal 10 exists in the stored or acquired location information, the mobile user terminal 10 selects the Wi-Fi® access information storing the wireless LAN connection or the acquired Wi-Fi® access information and performs data communication with a router 100 through the wireless LAN in priority to a base station 3 (step S06). In the step S06, the mobile user terminal 10 performs data communication with a router 100 through wireless LAN connection.

On the other hand, if the mobile user terminal 10 judges that the mobile user terminal 10 cannot connect to a wireless LAN, in other words, if the location information of the mobile user terminal 10 does not exist in the stored or acquired location information, the mobile user terminal 10 preforms data communication with a base station 3 (step S07).

System Summary of Communication Switching System 1

Figure 2:
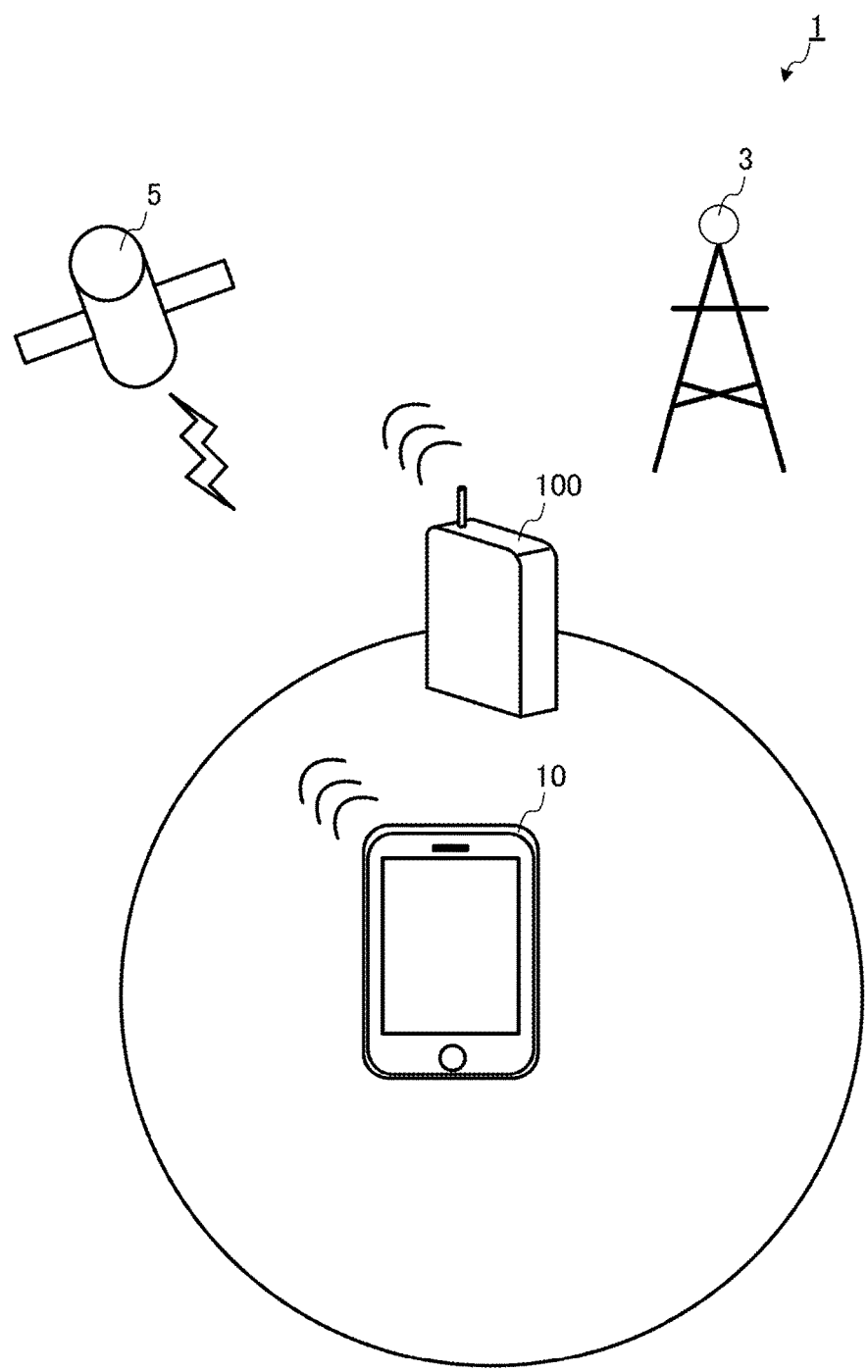
FIG. 2 shows an overall configuration diagram of the communication switching system 1.

FIG. 2 shows a block diagram illustrating a communication switching system 1 according to a preferable embodiment of the present invention. The communication switching system 1 includes a mobile user terminal 10, a base station 3, a GPS system 5, and a router 100. The mobile user terminal 10 can acquire information on its present position by a GPS system 5. The mobile user terminal 10 enables data communication with a router 100 through Wi-Fi® connection. The mobile user terminal 100 can perform data communication with a base station 3 through a public line network 5 (e.g. the Internet network, a third and a fourth generation networks).

The mobile user terminal 10 has functions to be described later and a capability of data communication, which is a home or an office appliance. Examples of the mobile user terminal 10 may include information appliances such as a mobile phone, a mobile information terminal, a tablet terminal, a net book terminal, a slate terminal, an electronic book terminal, and a portable music player.

The base station 3 is a general base station provided from a carrier, which performs data communication and other communications with a mobile user terminal 10.

The GPS system 5 is a general GPS system in which a plurality of GPS satellites each transmit signals to a mobile user terminal 10.

The router 100 is a general router performing data communication with a mobile user terminal 10 through the Wi-Fi® connection and also a public line network.

Functions

Figure 3:
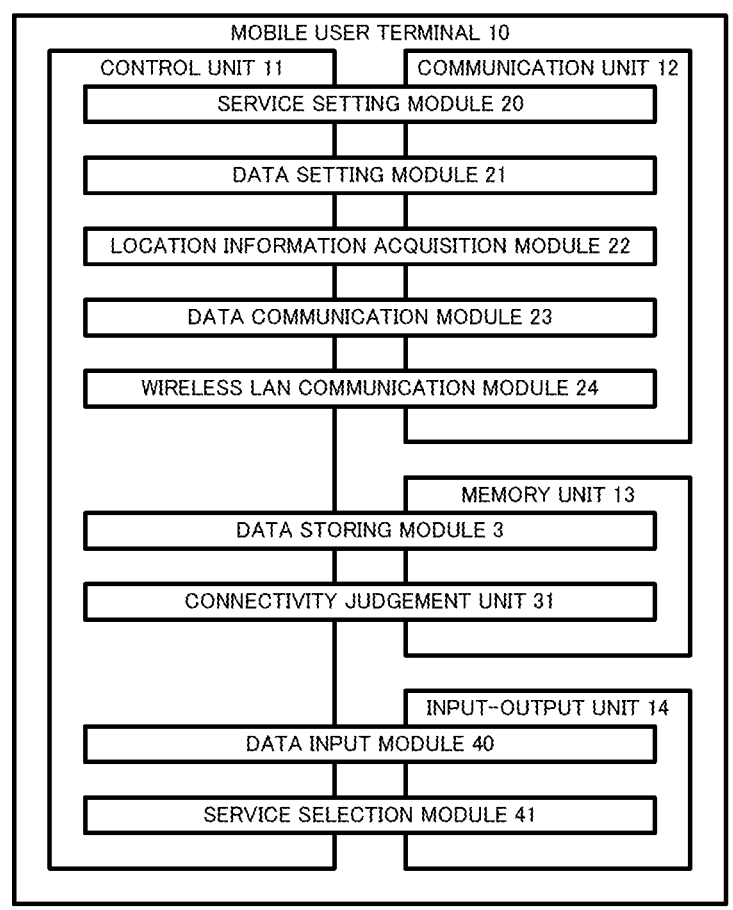
FIG. 3 shows a functional block diagram of the mobile user terminal 10.

The structure of each device will be described below with reference to FIG. 3.

The mobile user terminal 10 includes a control unit 11 provided with a central processing unit (hereinafter referred to as "CPU"), a random access memory (hereinafter referred to as "RAM"), and a read only memory (hereinafter referred to as "ROM") and a communication unit 12 such as a device with a capability of communicating with other devices, for example, a Wireless Fidelity or Wi-Fi® enabled device complying with IEEE 802.11.

The mobile user terminal 10 also includes a memory unit 13 such as a hard disk, a semiconductor memory, a record medium, or a memory card to store data. The memory unit 14 contains a service data table and an area data table that are to be described later.

The mobile user terminal 10 also includes an input-output unit 14 including a display unit outputting and displaying data and images that have been processed by the control unit 11; and also including a touch panel, a keyboard, and a mouse that receive an input from the user.

In the mobile user terminal 10, the control unit 11 reads a predetermined program to run a service setting module 20, a data setting module 21, a location information acquisition module 22, a data communication module 23, and a wireless LAN communication module 24 in cooperation with the communication unit 12. Furthermore, in the mobile user terminal 10, the control unit 11 reads a predetermined program to run a data storing module 30 and a connectivity judgment unit 31 in cooperation with the memory unit 13. Still furthermore, in the mobile user terminal 10, the control unit 11 reads a predetermined program to run a data input module 40 and a service selection module 41 in cooperation with the input-output unit 14.

Communication Switching Process

Figure 4:
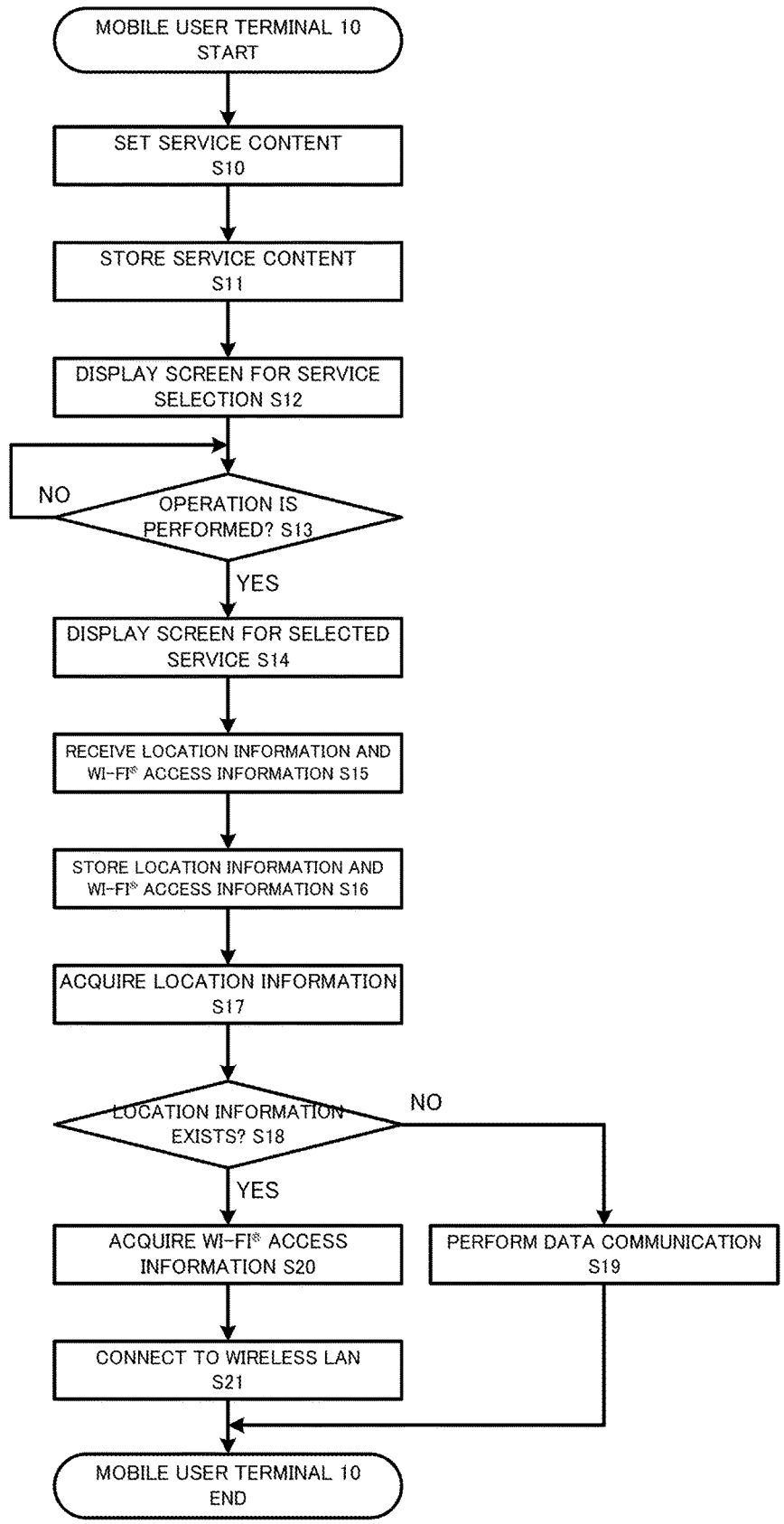
FIG. 4 shows a flow chart of the communication switching process executed by the mobile user terminal 10.

FIG. 4 shows a flow chart of the communication switching process executed by the mobile user terminal 10. The tasks executed by the modules of the above-mentioned devices are explained below together with this process.

First, the service setting module 20 of the mobile user terminal 10 sets a service content of its data communication (step S10). In the step S10, the service content of data communication that the service setting module 20 sets is provided from a carrier to which the user of the mobile user terminal 10 has a contract.

In the step S10, the service setting module 20 receives an input of the service content directly from a user to the mobile user terminal 10 and sets the service content of the data communication based on the received service content. In the step S10, the service setting module 20 also acquires and sets the service content of the data communication from a server, data base, etc., of a carrier to which the user of the mobile user terminal 10 have a contract, through a public line network. Specifically, the service setting module 20 transmits identifiers identifying the mobile user terminal 10, such as a serial number, a phone number, and a MAC address, to a server, a data base, etc., of the carrier, acquires the service content of the data communication, and sets the service content.

The data storing module 30 of the mobile user terminal 10 stores the service content set by the service setting module 20 in the service data table shown in FIG. 5 (step S11).

Service Data Table

FIG. 5 shows a service data table stored by the data storing module 30. In FIG. 5, the data storing module 30 associates and stores the service name and the service content that are acquired by the service setting module 20. The service content specifies data communication in a Wi-Fi® communication area to be described later and other locations. In the service data table, items other than the service name and the service content are associated and stored. The service may have more or less types than that shown in this embodiment. The service may have more or less contents than that shown in this embodiment.

Figure 7:
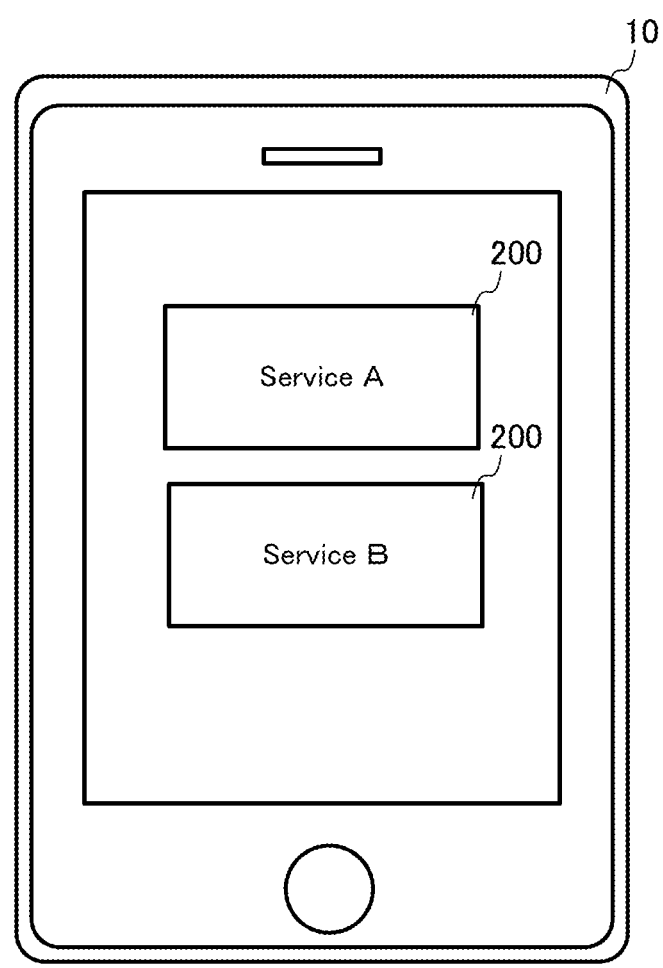
FIG. 7 shows a screen for service selection displayed by the mobile user terminal 10.

Then, the service selection module 41 of the mobile user terminal 10 starts an application for service selection and displays the screen for service selection shown in FIG. 7 (step S12). The service selection module 41 displays a plurality of service names stored by the data storing module 30. In FIG. 7, the service selection module 41 displays a service selection frame 200. The service selection frame 200 displays each of the plurality of service names stored by the data storing module 30.

Figure 8:
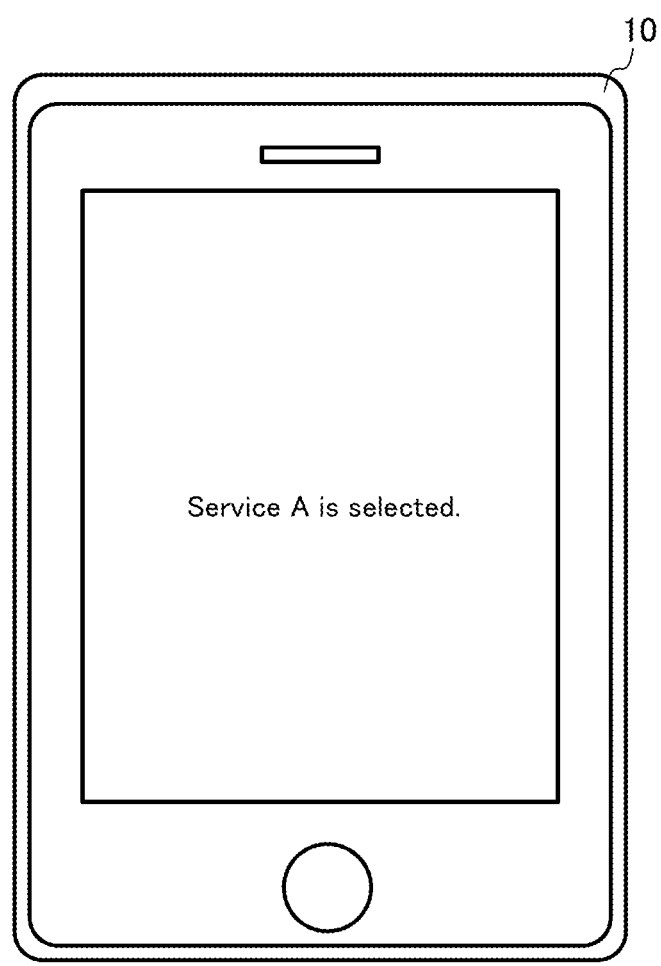
FIG. 8 shows a screen for selected service displayed by the mobile user terminal 10.

The service selection module 41 judges whether or not an operation is performed in the service selection frame 200 (step S13). In the step S13, if no operation is performed in the service selection frame 200 (NO), the service selection module 41 repeats this process. On the other hand, if an operation is performed in the service selection frame 200 (YES) in the step S13, the service selection module 41 displays the selected service name in the screen for selected service shown in FIG. 8 (step S14).

Then, the data input module 40 of the mobile user terminal 10 receives location information about a location where the mobile user terminal 10 can connect to this wireless LAN; and also receives Wi-Fi® access information to connect the wireless LAN from an input from the user (step S15). In the step S15, the data setting module 21 of the mobile user terminal 10 may acquire location information about a location where the mobile user terminal 10 can connect to a wireless LAN; and also receives Wi-Fi® access information to connect the wireless LAN from a server, a data base, etc., of a provider providing a public wireless LAN service. In the step S15, the location information specifies latitude and longitude or others directly input from a user; or acquired from an application such as a map application, a website, etc., or a GPS system 5. In the step S15, the Wi-Fi® access information is an ID or identifier to connect to a wireless LAN, specifically including an SSID and an SSID password. The location information may be information acquired by another method. The Wi-Fi® access information may be other information to connect to a wireless LAN.

The data storing module 30 of the mobile user terminal 10 associates and stores the location information with the Wi-Fi® access information in the area data table shown in FIG. 6 (step S16). Both the location information and the Wi-Fi® access information are acquired in the step S15.

Area Data Table

FIG. 6 shows an area data table stored by the data storing module 30. In FIG. 6, the data storing module 30 associates and stores a user ID with area information, location information, and Wi-Fi® access information. In the area data table, the user ID is an identifier to identify the mobile user terminal 10. The area information identifies an area. This area information specifies an approximate location such as a prefecture and a region. The location information specifies the location of each wireless LAN. The Wi-Fi® access information specifies an SSID and an SSID password to connect the wireless LAN in this location information. In this embodiment, the location information specifies latitude and longitude. However, as described above, the location information may store other information specifying a location in a different way, without being limited to latitude and longitude. If the wireless LAN does not have a password, the Wi-Fi® access information may specifies an empty password or that no password is set. The wireless LAN with no password may be eliminated and may not be stored. In the area data table, the number and the types of each item may be more or less than those in this embodiment and may be appropriately changed.

Then, the location information acquisition module 22 of the mobile user terminal 10 acquires its location information from a GPS system 5 and recognizes its location (step S17). In the step S17, the timing when the location information acquisition module 22 acquires the location information of the mobile user terminal 10 is as described above.

The connectivity judgment unit 31 of the mobile user terminal 10 searches location information stored by the data storing module 30 by the location information of the mobile user terminal 10 that is acquired in the step S17 and judges whether or not the acquired location information is stored (step S18). Specifically, in the step S18, the connectivity judgment unit 31 judges whether or not the location of the mobile user terminal 10 can connect to a wireless LAN. In the step S18, the location information acquisition module 22 may acquire information on the location of a public wireless LAN spot from a server, a data base, etc., of a provider providing a public wireless LAN service. Then, the connectivity judgment unit 31 may search information on the location of the public wireless LAN spot by the location information of the mobile user terminal 10 that is acquired by the location information acquisition module 22 and judge whether or not the location of the mobile user terminal 10 can connect to the wireless LAN.

If the connectivity judgment unit 31 judges that the acquired location information is not stored (NO) in the step S18, the data communication module 23 performs data communication with a base station 3 (step S19).

On the other hand, if the connectivity judgment unit 31 judges that the acquired location information is stored (YES) in the step S18, the wireless LAN communication module 24 acquires Wi-Fi® access information associated with this location information (step S20).

The wireless LAN communication module 24 performs data communication with a router 100 through Wi-Fi® connection in priority to data communication with a base station 3 based on the acquired Wi-Fi® access information (step S21). In the step S21, the wireless LAN communication module 24 performs data communication with a router 100 through wireless LAN connection.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Communication switching system
3 Base station
5 GPS system
10 Mobile user terminal
100 Router

What is claimed is:

1. A mobile user terminal enabling data communication through a wireless LAN and through connection to a base station, comprising:
   a location information storing unit that stores a table, the table storing location information about a plurality of locations where the mobile user terminal can connect to the wireless LAN and a plurality of IDs to connect the wireless LAN, and each of the plurality of IDs being associated with a corresponding one of the plurality of locations;

a location information detection unit that detects present location information of the mobile user terminal;

a wireless LAN area judgment unit that judges whether or not the detected location information is stored in the table; and a wireless LAN connection unit that performs data communication through the wireless LAN in priority over the base station by selecting an ID associated with the location corresponding to the detected location information from among the plurality of IDs if judging that the detected location information is stored in the table.

2. The mobile user terminal according to claim 1, wherein the data communication through a wireless LAN is data communication through the Wi-Fi® connection, and the IDs are SSIDs.

3. A method of switching communications executed by a mobile user terminal enabling data communication through a wireless LAN and through connection to a base station, comprising:

storing location information about a plurality of locations where the mobile user terminal can connect to the wireless LAN and a plurality of IDs to connect the wireless LAN in a table, each of the plurality of IDs being associated with a corresponding one of the plurality of locations;

detecting present location information of the mobile user terminal;

judging whether or not the detected location information is stored in the table; and performing data communication through the wireless LAN in priority over the base station by selecting an ID associated with the location corresponding to the detected location information from among the plurality of IDs if judging that the detected location information is stored in the table.

4. A computer program product for use in a mobile user terminal enabling data communication through a wireless LAN and through connection to a base station comprising a non-transitory computer usable medium having a set of instructions physically embodied therein, the set of instructions including computer readable program code, which when executed by the mobile user terminal causes the information processing unit to:

store location information about a plurality of locations where the mobile user terminal can connect to the wireless LAN and a plurality of IDs to connect the wireless LAN in a table, each of the plurality of IDs being associated with a corresponding one of the plurality of locations;

detect present location information of the mobile user terminal;

judge whether or not the detected location information is stored in the table; and perform data communication through the wireless LAN in priority over the base station by selecting an ID associated with the location corresponding to the detected location information from among the plurality of IDs if judging that the detected location information is stored in the table.

* * * * *